(12) United States Patent
Van Der Sijde et al.

(10) Patent No.: US 11,076,145 B2
(45) Date of Patent: Jul. 27, 2021

(54) DEPTH MAP GENERATOR

(71) Applicant: Lumileds LLC, San Jose, CA (US)

(72) Inventors: Arjen Van Der Sijde, Eindhoven (NL); Nicola Pfeffer, Eindhoven (NL)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 16/526,995

(22) Filed: Jul. 30, 2019

(65) Prior Publication Data
US 2020/0045297 A1 Feb. 6, 2020

(30) Foreign Application Priority Data

Aug. 1, 2018 (EP) .................................... 18186754

(51) Int. Cl.
*H04N 13/271* (2018.01)
*G01S 17/48* (2006.01)
*H04N 13/254* (2018.01)
*H04N 13/296* (2018.01)
*H04N 13/239* (2018.01)

(52) U.S. Cl.
CPC .......... *H04N 13/271* (2018.05); *G01S 17/48* (2013.01); *H04N 13/239* (2018.05); *H04N 13/254* (2018.05); *H04N 13/296* (2018.05)

(58) Field of Classification Search
CPC .. H04N 13/271; H04N 13/239; H04N 13/254; H04N 13/296; G01S 17/48
See application file for complete search history.

(56) References Cited

U.S. PATENT DOCUMENTS

| | | | |
|---|---|---|---|
| 9,992,474 B2* | 6/2018 | Grunnet-Jepsen ... | H04N 13/239 |
| 2015/0022644 A1* | 1/2015 | Appia .................. | H04N 13/271 |
| | | | 348/49 |
| 2016/0006914 A1* | 1/2016 | Neumann ............. | G01S 7/4817 |
| | | | 348/78 |
| 2017/0272726 A1* | 9/2017 | Ovsiannikov ......... | G01C 25/00 |
| 2020/0217931 A1* | 7/2020 | Lawrenson ............ | G01S 7/484 |

OTHER PUBLICATIONS

"European Application Serial No. 18186754.0, Extended European Search Report dated Feb. 12, 2019", 8 pgs.

(Continued)

*Primary Examiner* — Tsion B Owens
(74) *Attorney, Agent, or Firm* — Schwegman Lundberg & Woessner, P.A.

(57) ABSTRACT

The invention describes a depth map generator comprising an array comprising a plurality of individually addressable array elements, wherein an array element comprises a semiconductor emitter or a reflector arranged to reflect light emitted by a semiconductor emitter; a driver realised to switch an array element according to a predefined illumination pattern; a number of image sensors, wherein an image sensor is arranged to detect light reflected from a scene irradiated by the irradiation pattern; and a processing unit realised to compute a depth map of the scene on the basis of a light pattern detected by an image sensor. The invention further describes an irradiation arrangement for use in such a depth map generator; a method of generating a depth map of a scene; and a device comprising such a depth map generator.

15 Claims, 5 Drawing Sheets

(56) References Cited

OTHER PUBLICATIONS

"International Application Serial No. PCT/EP2019/069676, International Preliminary Report on Patentability dated Feb. 11, 2021", 9 pgs.
"International Application Serial No. PCT/EP2019/069676, International Search Report dated Oct. 17, 2019", 3 pgs.
"International Application Serial No. PCT/EP2019/069676, Written Opinion dated Oct. 17, 2019", 7 pgs.

* cited by examiner

DEPTH MAP GENERATOR

FIELD OF THE INVENTION

The invention describes a depth map generator, an illumination arrangement for use in such a depth map generator, a method of generating a depth map of a scene, and a device comprising such a depth map generator.

BACKGROUND

The range of consumer products that incorporate some kind of biometric identification means is increasing. Fingerprint identification is widely used to unlock a mobile device such as a smartphone, to authorize payment from a mobile device, etc. Some devices also already incorporate 2D face recognition, for example by geometric analysis of distinguishing facial features in a 2D image of the face, or by applying a statistical technique based on comparison of the 2D image with template images. The accuracy of 2D facial recognition depends to a great extent on the quality of the image, which can be reduced in poor lighting conditions.

In applications such as 3D face recognition systems, the surface contours of the face are also detected and used by the face recognition algorithm. This additional information describing the topology of the surface contours can significantly increase the accuracy of the results. Other applications such as augmented reality, self-driving cars, drones etc. can also benefit from knowledge of a depth map of a contoured object or a contoured environment.

There are various ways of obtaining a depth map, for example by implementing a single camera in combination with projected structured light to illuminate the object. In such a system, narrow bands of light can be projected onto the object, for example a face. Depending on the distance between the camera and the structured light source, as well as on the distance between the contoured object to the camera, the projected lines will shift by different amounts. The topology of the surface contours can be determined on the basis of these differences. In another approach, two cameras may be used in conjunction with a single light source emitting in the visible range, and the cameras are calibrated using projected structured light. In some face recognition applications, an optical element is used to create a structured light pattern from light emitted by an array of LEDs or VCSELs. The limitation of such an approach is that only a single pattern can be created. When used in a space-constrained application such as a smartphone, the precision required in manufacturing the very small scale optical element adds to the overall cost of the device. Another drawback of such systems is that a second light source emitting in the visible range is needed for flood illumination of the scene (e.g. for a 2D face recognition algorithm).

Therefore, it is an object of the invention to provide a way of obtaining a depth map that overcomes the problems outlined above.

SUMMARY

The object of the invention is achieved by the depth map generator of claim 1; by the illumination arrangement of claim 9; by the method of claim 10 of generating a depth map of a scene; and by the handheld device of claim 15.

According to the invention, the depth map generator comprises an array of a plurality of individually addressable array elements. An array element can be a semiconductor emitter, and the array can be realised as a single semiconductor die comprising the plurality of emitters, or as an array of semiconductor emitter dies. Equally, an array element can be a reflector arranged to reflect light emitted by a semiconductor emitter, for example an array of micro-mirrors arranged to deflect the light originating from one or more semiconductor emitters. The inventive depth map generator further comprises a driver realised to switch an array element according to a predefined illumination pattern. An illumination pattern defines the activation state of each array element. The inventive depth map generator further comprises a number of image sensors, wherein an image sensor is arranged to detect light reflected from a scene or target illuminated by the illumination pattern; and a processing unit realised to compute a depth map of the scene on the basis of a light pattern detected by an image sensor. The processing unit can be realised to perform a suitable technique such as triangulation using certain known system parameters as well as the information derived from the detected light pattern.

An advantage of the inventive depth map generator is that the array or matrix of individually addressable segments is an economical way of creating a structured light pattern for use in depth map calculation. Because the light pattern or illumination pattern is created at the array itself, the system does not require an expensive optical element, unlike some conventional prior art approaches. Therefore, the manufacturing costs of the inventive depth map generator can be favourably low. Furthermore, the inventive depth map generator can be realised without any light absorbing element or mask in the light path in order to achieve a desired illumination pattern, so that the efficiency of the overall system can be favourably maximized.

According to the invention, the illumination arrangement for use in such a depth map generator comprises an array of individually addressable array elements, wherein an array element comprises a semiconductor emitter or, alternatively, a reflector arranged to reflect light emitted by a semiconductor emitter. The illumination arrangement further comprises a number of image sensor arrays, wherein an image sensor array is arranged to detect light reflected from a scene illuminated by the illumination pattern; a first interface for connection to the driver of the depth map generator; and a second interface for connection to the processing unit of the depth map generator.

According to the invention, the method of generating a depth map of a scene comprises the steps of arranging an embodiment of the inventive depth map generator in front of a scene; choosing an illumination pattern to illuminate the scene; switching the individually addressable array elements according to the illumination pattern; and computing a depth map of the scene on the basis of the reflected light detected by the image sensor arrays.

The inventive method requires relatively little computational effort and can deliver favourably accurate results. Instead of the fixed illumination pattern known from the prior art solutions that use a structured optical element, the illumination pattern used in the inventive method can be chosen to suit the scene to be mapped.

According to the invention, the device comprises an embodiment of the inventive depth map generator, and can be provided for any number of applications, for example as a handheld device such as a smartphone, in an automotive vision system, etc. The inventive depth map generator can be used in any application that benefits from depth mapping, for example face recognition to unlock a smartphone, or driver-assist applications to increase road safety, etc.

The dependent claims and the following description discloses particularly advantageous embodiments and features of the invention. Features of the embodiments may be combined as appropriate. Features described in the context of one claim category can apply equally to another claim category.

In the context of the invention, the terms "array" and "matrix" are synonyms and may be used interchangeably in the following. The terms "illuminate" and "irradiate" may be used interchangeably also, bearing in mind that only an infrared sensor can "see" an object illuminated or irradiated by infrared light. In the following, but without restricting the invention in any way, it may be assumed that a semiconductor emitter emits light in the infrared wavelength range, i.e. at wavelengths in the region 700-1000 nm.

In a preferred embodiment of the invention, the array comprises a plurality of individually addressable semiconductor emitters, and an optical element is provided to shape the light emitted by the semiconductor emitters of the array. Such an optical element may be a simple (non-perfect) imaging lens arranged at a distance from the emitter array, for example. Alternatively, an emitter may be provided with a microlens at package level. For example, in the case of a single semiconductor die comprising multiple emitters, an array of micro-lenses may be formed essentially directly on the emitter array. In such embodiments, the only element between the emitter array and the scene is the lens, so that light absorption between emitter and target is minimized. Such an emitter array may be manufactured as an array or matrix of individually addressable infrared LEDs or vertical-cavity surface emitting laser (VCSEL) diodes.

In a further preferred embodiment of the invention, the array comprises a plurality of individually addressable micro-mirrors arranged to reflect or deflect the light originating from one or more semiconductor emitters. In such an embodiment, the only element between the emitter and the scene is the reflective surface of a mirror, so that light absorption between emitter and target is negligible. Such micro-mirrors can be switched at very high frequencies, so that the resulting pattern of "on" and "off" pixels can appear to originate from an array of emitters.

Preferably, the array comprises at least 100 individually addressable array elements, for example arranged in a 10×10 array. Each individually addressable array element may be regarded as a "pixel". Of course, a "pixel" can comprise more than one array element, i.e. an individually controllable set of array elements, but in the following it may be assumed that each array element is addressed separately and that a single array element acts as a pixel of the array.

The image sensor comprises an array of photosensors or photodetectors, wherein a photosensor is sensitive to the wavelength of light originating from the array. Therefore, in the case of infrared emitting semiconductor diode(s), the image sensor comprises an array of infrared-sensitive photosensors. Image sensors for use in digital cameras are generally sensitive to visible light and also to infrared light, and the inventive depth map generator may therefore use such a readily available image sensor array. Of course, the assembly will not include an infrared filter that would usually be part of a visible-light camera assembly.

To distinguish between the array of individually addressable elements used to generate an illumination pattern, and an image sensor array, the term "emitter array" may be used in the following to refer to the array of individually addressable elements, and shall be understood to apply equally to an array of emitters and to an array of reflectors. In a particularly preferred embodiment of the invention, the depth map generator comprises two image sensors, arranged on opposite sides of the emitter array. In such an embodiment, the emitter array is located between the two image sensors, and the system is given a measure of redundancy. The "stereo vision" of the dual image sensor embodiment can provide more accurate results for relatively difficult conditions, for example when the object whose depth is being measured is completely or partially in shadow. In a dual image sensor embodiment, the depth map can be computed by identifying the same objects in each image and deducing the distances to these objects from the shift or disparity between the images. In a visible-light 3D depth map generator, scenes without structure and contrast such as white backgrounds or light-coloured and/or very smooth objects can make it difficult to identify objects with the aim of calculating depth disparity. Similarly, a dark scene would require active illumination. These difficulties are overcome by an embodiment of the inventive depth map generator using infrared emitters and image sensors.

To obtain a depth map for an entire scene, or for an object in a scene (for example for a face that partially fills the field of view), suitable pre-defined illumination patterns are used to illuminate the scene. As mentioned above, only the infrared sensor can detect an object irradiated by infrared light, so that an illumination pattern may be referred to in the following as an "irradiation pattern". Preferably, an irradiation pattern defines a number of active array regions or pixels of the emitter array such that each active array region is bounded by at least two inactive array regions.

The invention is based on the insight that the distance to an illuminated point on a scene can be established by identifying the position of the corresponding detecting photosensor(s) in a sensor array. An offset between the expected position of a detected pixel to the actual position of the detected pixel is used to calculate the distance to the illuminated or irradiated point. This works best when active "pixels" of the emitter array are adjacent to inactive "pixels", a concept which can be visualised as a black-and-white pattern, in which white represents emitters that are "on". An illumination pattern may comprise alternating rows of active and inactive array regions, alternating columns of active and inactive array regions, a chessboard pattern of active and inactive array regions, a random arrangement of active and inactive array regions, etc. In a preferred embodiment of the invention, any emitter array pixel that is "on" is neighboured by two or more emitter array pixels that are "off". This makes it relatively easy to identify a specific "pixel" in the sensor array. In a further preferred embodiment of the invention, the rows or columns of an illumination pattern may be two or more emitter array pixels wide.

The emitter array and the image sensor(s) can be mounted on a common carrier such as a printed circuit board, although this is not strictly necessary, and the emitter array need not lie in the same plane as the image sensor(s). Slight tolerances in the manufacture of the depth map generator can be compensated by a calibration procedure. Preferably, before computing a depth map for a contoured object in a scene, the depth map generator carries out a calibration procedure to establish a physical relationship between the emitter array and an image sensor. To this end, the emitter array can be used to cast a simple calibration pattern from a known distance onto a suitable surface such as a white wall. The pattern is reflected from the surface and imaged by the sensor. Knowing the shape of the calibration pattern, the system can deduce the absolute position of the pattern at that known distance. This allows to adjust for shifts that may originate from alignment tolerances between the emitter array and the image sensor(s) and which otherwise might later be wrongly interpreted as disparity due to differences in depth position of the imaged object(s) in an imaged scene. The calibration step ensures that the depth map generator has an absolute reference between pattern position and distance of objects in the scene. Calibration and verification can be carried out in the factory, e.g. in a final assembly stage of the illumination arrangement. An image sensor array and emitter array are aligned along a certain axis, and lines perpendicular to that axis can be used for depth map creation. In a dual-sensor embodiment, the image sensors are aligned along a certain axis (which may also include the emitter array), and disparities between the imaged scenes lie along that axis.

When computing a depth map for a contoured object in the field of view of the depth map generator, accuracy of the depth map can be improved by first irradiating the scene with one pattern to compute a first depth map, and then irradiating the scene with a second (different) pattern to obtain further information to improve the depth map. For example, a first irradiation pattern can be a series of horizontal stripes, and the second irradiation pattern can be the inverse of the first irradiation pattern, so that each emitter array pixel is activated at some stage and every part of the scene receives illumination at some stage. Of course, there is no limit to the number and combination of irradiation patterns that can be used in sequence during computation of a depth map. For example, a sequence can be chosen to successively illuminate the scene in a vertical direction, for example from top to bottom, and/or in a horizontal direction for example from left to right.

The irradiation pattern comprises light regions (active emitter array pixels) and dark regions (inactive emitter array pixels), for example in a line pattern. Preferably, a line pitch of the irradiation pattern is chosen so that the lines can be identified without ambiguity in an image of the scene. This can be dynamically adjusted, for example if the processing unit is unable to clearly identify the pattern in the scene images, the line pitch of the irradiation pattern can be adjusted. Equally, a relatively large line pitch can be used initially, and a finer line pitch can be used to improve the accuracy of the depth map. This higher accuracy can also be applied selectively to areas in which objects of interest have been identified (e.g. faces or facial regions).

In addition to defining the activation states of each individually addressable array element of the emitter array, an irradiation pattern preferably also defines the current level and/or activation duration of any active semiconductor emitter(s). In this way, the brightness of specific "pixels" can be tuned according to a required light level according to the reflectivity of the objects in the scene and/or according to the proximity of the objects in the scene. Preferably, the type and/or sequence of irradiation patterns to be used may be chosen on the basis of an initial depth map. In this way, the depth map generator can dynamically adapt the irradiation patterns to scene requirements.

While an irradiation pattern will comprise both "on" and "off" emitters during computation of a depth map, the emitter array can of course be used to completely illuminate the scene, for example when flood illumination is required. During flood illumination, all emitters are "on."

Other objects and features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION OF THE DRAWINGS

In the drawings, like numbers refer to like objects throughout. Objects in the diagrams are not necessarily drawn to scale.

DETAILED DESCRIPTION OF THE EMBODIMENTS

Figure 1:
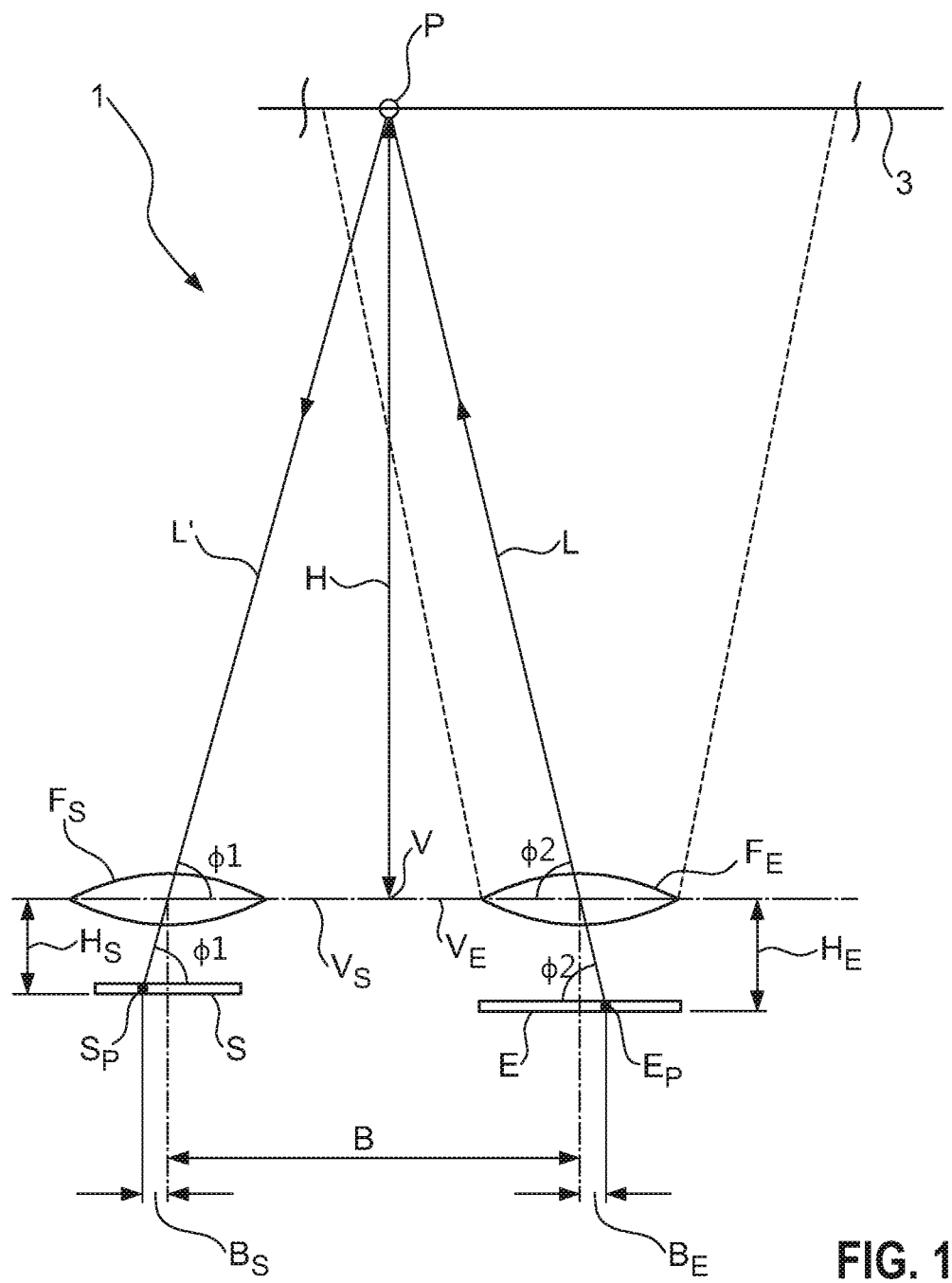
FIG. 1 illustrates the underlying principle of the invention in a first embodiment of the inventive illumination arrangement.

FIG. 1 illustrates the underlying principle of the invention. The diagram shows an emitter array E and an image sensor S of a camera at some distance from a scene 3. The scene 3 is simply illustrated as a line, but can be a face, a scene in front of an automobile, etc. In this embodiment, the emitter array E comprises a relatively large array of infrared light-emitting diodes or VCSELs, arranged for example in a 10×10 array. The emitter array E is arranged at a distance HE behind a lens FE, and the image sensor S is arranged at a distance HS behind a lens FS. For the sake of simplicity, the imaging lenses FE, FS are shown in a common plane, but such an arrangement is not strictly necessary. The centre of each lens FE, FS corresponds to the centre of the respective array E, S. The distance B is measured from the centre of the first lens FE to the centre of the camera lens FS. The field of view of the emitter array should exceed the camera's field of view. The image sensor S can comprise an array of infrared-sensitive photodiodes (photosensors), for example at least ten times the number of emitter pixels. This ensures that the size of a detected disparity is a fraction of the line pitch of the on-scene irradiation pattern.

The array of emitters irradiates a scene in its field of view, i.e. the emitter array casts an irradiation pattern into its field of view. The image sensor captures an image of the irradiated scene. The diagram shows the path of a light ray L from an emitter pixel EP to point P in the scene, from which it is reflected as light ray L' and detected by image sensor pixel(s) SP. In simplified ray optics, rays L, L' pass unchanged through the centres of the respective lenses FE, FS. Therefore, each pixel in the irradiated scene originates from a pixel of the emitter array, so that an emitter pixel EP subtends an angle $\phi 2$ to its corresponding scene pixel. The scene pixels are imaged by the image sensor S, so that a scene pixel P subtends an angle $\phi 1$ to its imaged pixel SP. A right angle is subtended between the illuminated pixel P in the scene and a point V in the plane of the lenses FE, FS. Recognising that $$B = V_S + V_E \qquad (1)$$

$$\tan\phi 2 = \frac{H}{V_E} \qquad (2)$$

$$\tan\phi 1 = \frac{H}{V_S} \qquad (3)$$

allows H to be expressed as:

$$H = B \frac{\tan\phi 1 \tan\phi 2}{\tan\phi 1 + \tan\phi 2} \quad (4)$$

The principle of similar triangles can then be applied in determining the distance to point P as follows: the position of the emitting pixel $E_P$ is known (from its position in the irradiation pattern), so that $$\tan\phi 2 = \frac{H_E}{B_E} \quad (5)$$

in which $H_E$ is the distance to lens $F_E$, and $B_E$ is the distance from the array centre to the emitting pixel $E_P$. Similarly, the position $B_S$ of the image sensor pixel $E_S$ can be determined (by comparing the sensed image to the irradiation pattern), so that $$\tan\phi 1 = \frac{H_S}{B_S} \quad (6)$$

These values can be substituted into equation (4) to solve for H. These computations are repeated for each pixel of the irradiation pattern.

Figure 2:
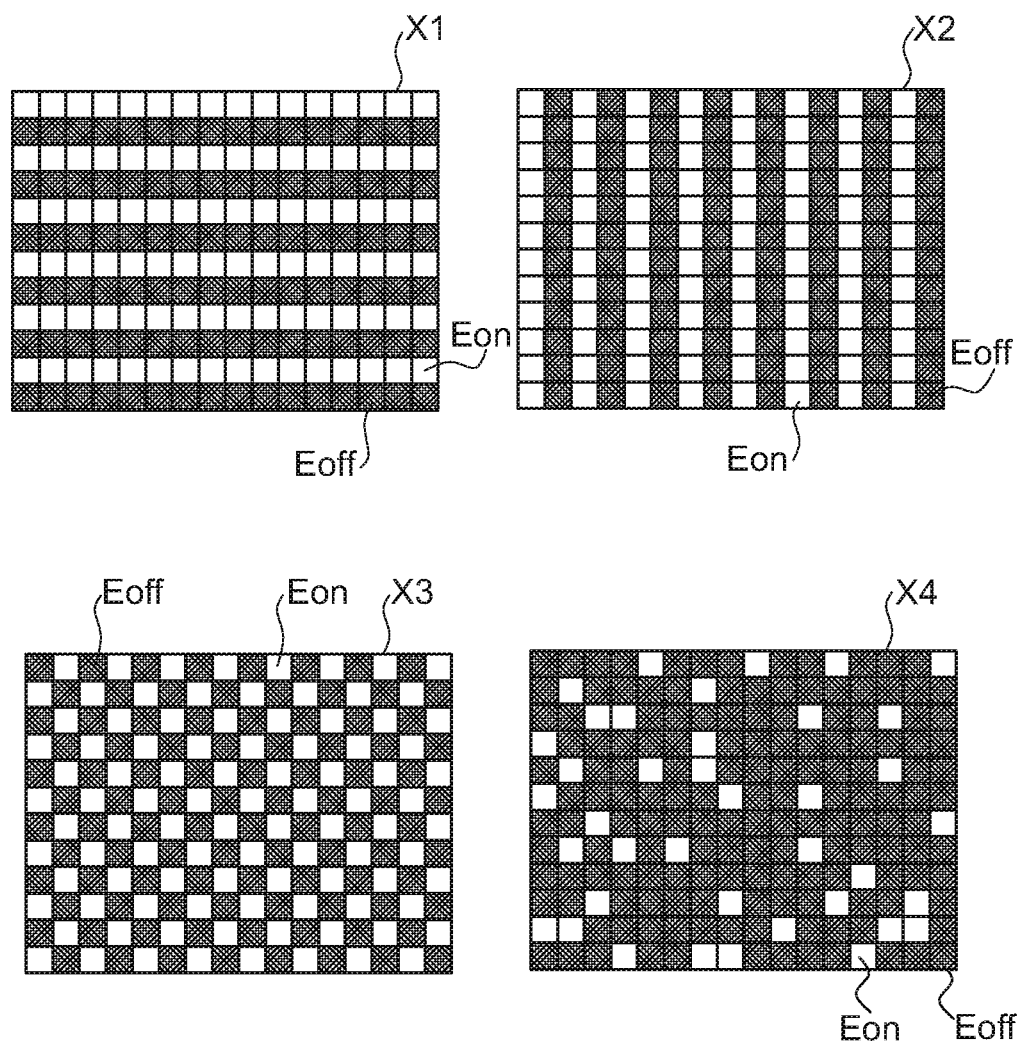
FIG. 2 shows various irradiation patterns.

As explained above, the invention is based on the insight that the distance to an illuminated point on a scene can be established by identifying the position of the corresponding detecting photosensor(s) in a sensor array. An offset between the expected position of a detected pixel to the actual position of the detected pixel is used to calculate the distance to the illuminated point. This works best with a "black & white" irradiation pattern, in which white represents emitters that are "on". FIG. 2 shows various possible irradiation patterns as applied to an array of individually addressable array elements: a horizontal stripe pattern X1, a vertical stripe pattern X2, a chessboard pattern X3, and a random dot pattern X4. In each case, the emitter array pixels EON that are "on" are neighboured by two or more array pixels EOFF that are "off". Of course, rows or columns of a striped pattern may comprise be more than one pixel wide. Such illumination patterns make it relatively easy to identify a specific "pixel" in the sensor array, even if the corresponding light rays were "deflected" from their expected position by the surface contour of the scene.

FIG. 1 corresponds to a first embodiment of the inventive depth map generator 1 that comprises a single camera with an image sensor S and an emitter array E. As explained above, light reflected from an irradiated point will be detected by photodiodes at some point on the image sensor S. The distance H to the irradiated point (i.e. the depth of point P in the scene 3) can be calculated as explained above. Of course, the irradiation pattern can comprise n active emitters, resulting in corresponding images on each of the sensors S1, S2, so that n distances to the n irradiated points are calculated. In this way, a depth map can be deduced for all irradiated points in the scene.

It shall be noted that the diagram is not to scale. Generally, the distance between emitter array E and image sensor S may be relatively small, for example from a few tens of millimetres to a few centimetres, while the distance to a scene can be in the order of 0.25 m to 3 m for consumer products such as mobile devices, and may exceed 3 m in the case of applications such as automotive imaging systems.

Figure 3:
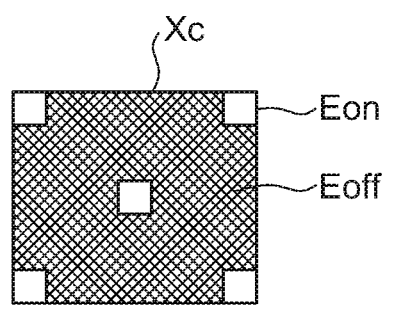
FIG. 3 shows a calibration pattern.

To correctly interpret an imaged irradiation pattern, the system carries out a calibration procedure to establish a relationship between the emitter array and any image sensor. A calibration procedure can be used to compensate for unavoidable inaccuracies in the arrangement of emitter array and image sensors. FIG. 3 shows a calibration pattern XC in which a set of emitters at the centre of the emitter array E is switched on, along with a set of emitters at each outer corner of the emitter array. Each set of emitters may comprise a single emitter or a sub-array, for example four emitters in a 2×2 sub-array or a 3×3 sub-array, etc. These five points fix the outer corners and centre point of the emitter array. In a calibration procedure, the device containing the depth map generator is arranged at a distance in front of a suitable surface such as a white wall and the calibration pattern XC is cast onto the surface and imaged by the sensor. Knowing the shape of the calibration pattern XC, and assuming that the surface is flat and that the imaged pattern is free of distortion, the system can establish an absolute reference between pattern position and distance of objects in the scene.

Figure 4:
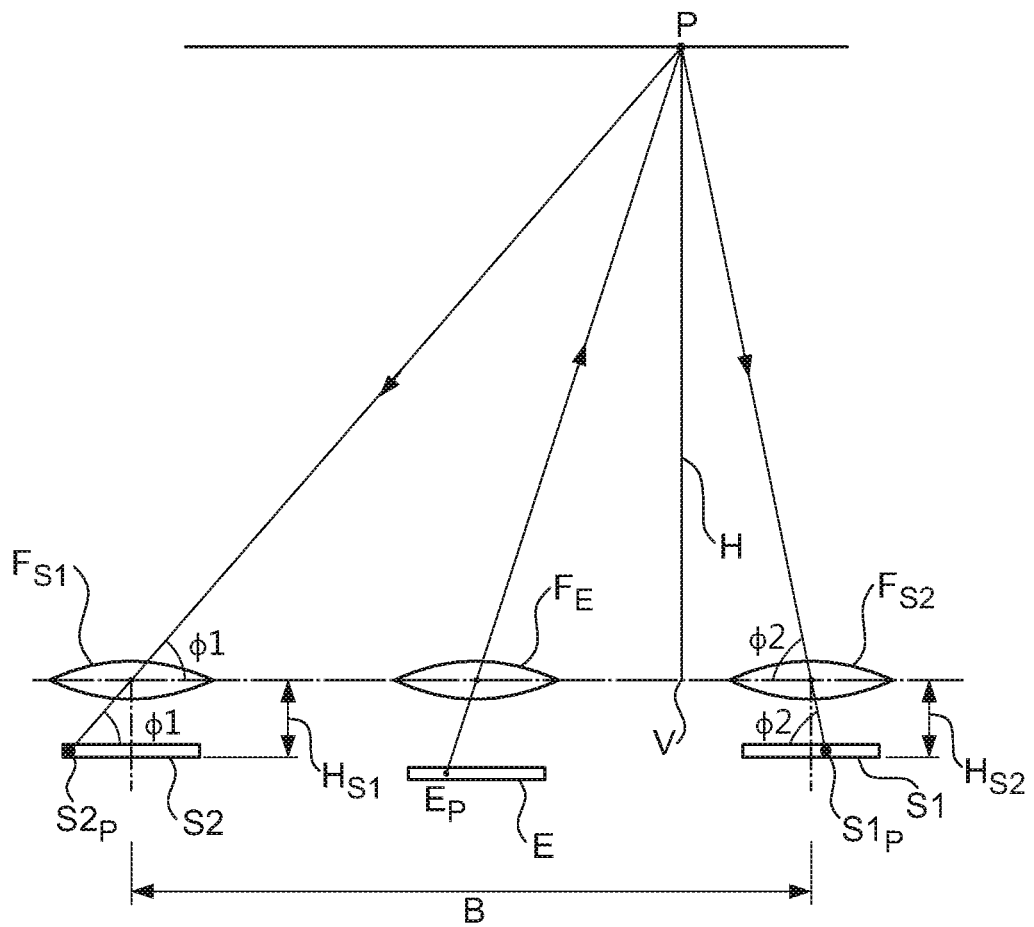
FIG. 4 shows a second embodiment of the inventive illumination arrangement.

FIG. 4 shows a second embodiment of the inventive depth map generator 1. Again, the diagram is not to scale. Here, the depth map generator 1 comprises an emitter array E and two cameras, represented here by two image sensors S1, S2, each with an imaging lens FS1, FS2. The two image sensors S1, S2 are arranged at a distance B from each other. This distance B may be measured between the midpoints of the sensor arrays S1, S2, i.e. between the midpoints of the corresponding imaging lenses FS1, FS2. The lenses FS1, FS2 are arranged at distances HS1, HS2 from the image sensors S1, S2. Light from the emitter array E is shaped by its imaging lens FE so that the emitter array E can illuminate a certain field of view (that is preferably large than each camera field of view to be able to create depth maps as large as the FOV of each camera). Each camera images the scene 3 onto its sensor S1, S2. The diagram shows the case for a single active emitter EP illuminating a point P on the object or scene 3. Light is reflected from that point P in the scene 3 and is detected by certain photosensors of each image sensor S1, S2. The reflected light will fall at different positions on each of the two image sensors S1, S2. In other words, the image pixel positions of the detecting photosensor(s) S1P of sensor S1 will be different from the image pixel positions of the detecting photosensor(s) S2P of sensor S2.

The distance H to the illuminated point (i.e. the depth of point P in the scene 3) can be calculated as explained above, recognising that a scene pixel P subtends an angle □1 to its imaged pixel S1P in the first image sensor S1, and the same scene pixel P subtends an angle □2 to its imaged pixel S2P in the second image sensor S2.

Figure 5:
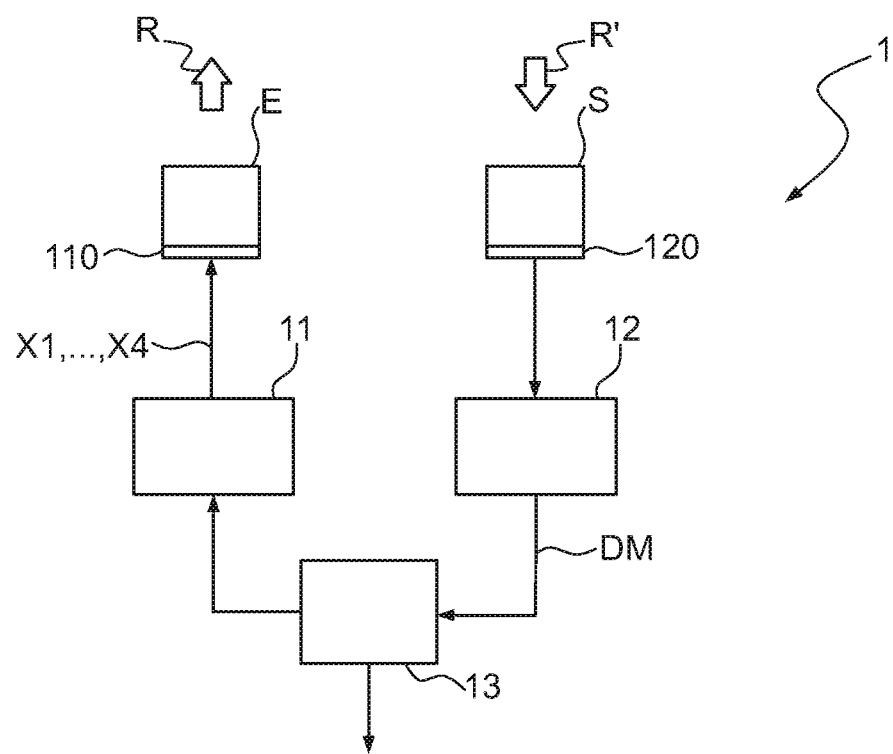
FIG. 5 shows an embodiment of the inventive depth map generator.

FIG. 5 is a block diagram of an embodiment of the inventive depth map generator 1. The relevant units and modules of the depth map generator 1 are shown, namely an emitter matrix E to emit light R onto a scene; a driver 11 to control the emitters of the emitter matrix according to an irradiation pattern X1, . . . , X4; an image sensor S to detect reflected light R' from the scene; a processor 12 configured to computer a depth map DM using e data from the image sensor S and known system parameters, and a controller 13 to control the driver 11 and to communicate with other components of a device that incorporates this depth map generator 1. An irradiation arrangement comprising the emitter matrix E and one or more image sensors S can be provided on a PCB with suitable connectors 110, 120 for connecting to the driver 11 and processor 12.

Figure 6:
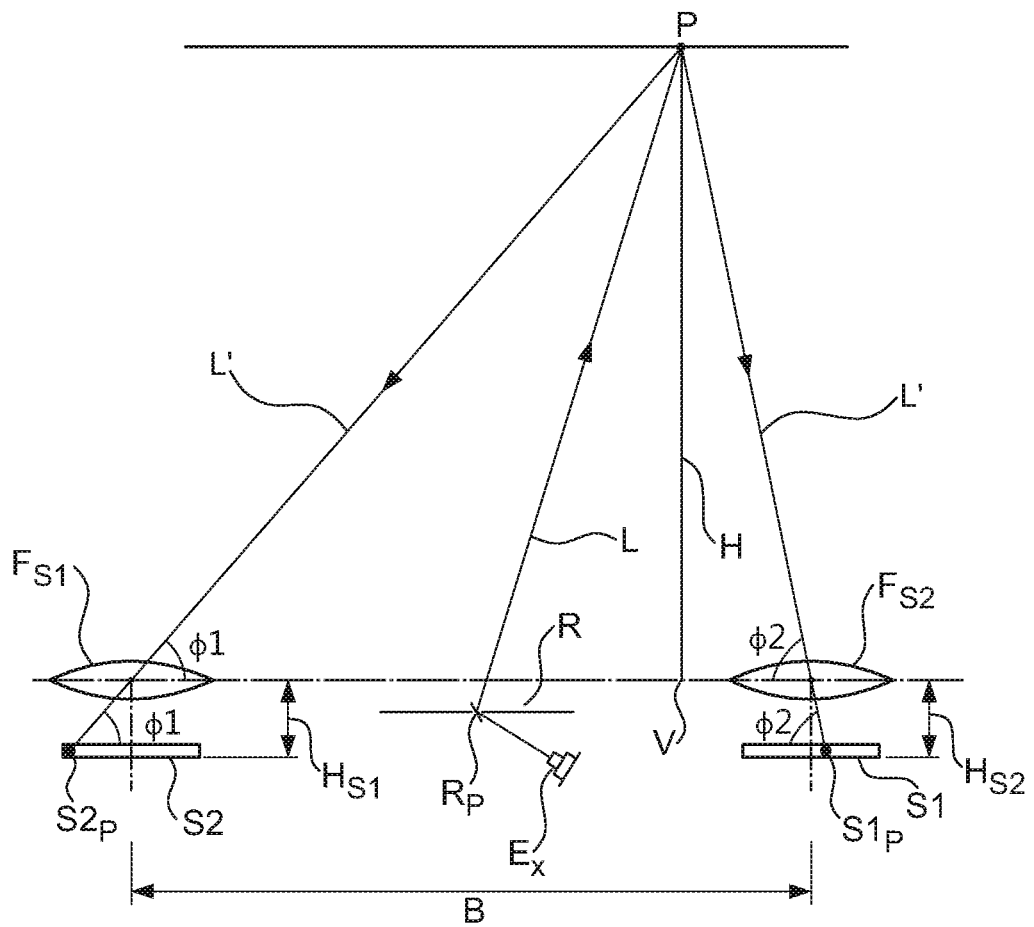
FIG. 6 shows a third embodiment of the inventive illumination arrangement.

FIG. 6 shows a third embodiment of the inventive illumination arrangement. In the same way as the embodiment of FIG. 4, an array of individually addressable array elements is arranged between two image sensors S1, S2. In this embodiment, an array R of micro-mirrors is arranged to deflect light L originating from an infrared semiconductor emitter EX such as a VCSEL or LED. The diagram illustrates—greatly simplified—a row of reflectors in such an array R, and indicates one reflector RP tilted (in response to a signal from the driver) to deflect the light L onto the scene 3. In such a realisation, the semiconductor emitter EX is always "on" during the depth map generation procedure, while the micro-mirrors are rapidly tilted to either cast the light onto the scene 3 (such micro-mirrors act as "active" array pixels), or to deflect the light such that it does not arrive at the scene 3 (such micro-mirrors act as "inactive" array pixels). The absence of any refracting lens element between the semiconductor emitter EX and the scene 3 or target means that there is essentially negligible light loss, so that the accuracy of the procedure is favourably high. The method explained in FIG. 4 above is used to compute the depth map of the scene 3.

Although the present invention has been disclosed in the form of preferred embodiments and variations thereon, it will be understood that numerous additional modifications and variations could be made thereto without departing from the scope of the invention. For example, embodiments of the inventive depth map generator may comprise two emitter arrays and a single camera; an assembly in which two cameras are arranged in line and with an emitter array perpendicularly offset from that line (this arrangement permits the use of alternating irradiation patterns of vertical lines and horizontal lines); an active emitter array with an active lens to allow sub emitter-lens-pitch shifts of the irradiation pattern to increase depth map resolution; two emitters with different emission wavelengths, visible line pattern, etc.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

| REFERENCE SIGNS: | |
|---|---|
| depth map generator | 1 |
| driver | 11 |
| driver interface | 110 |
| processing unit | 12 |
| processor interface | 120 |
| scene | 3 |
| emitter array | E, R |
| imaging lens | $F_E$, $F_S$ |
| semiconductor emitter | $E_P$ |
| semiconductor emitter | $E_X$ |
| micro-mirror | $R_P$ |
| active array region | $E_{ON}$ |
| inactive array region | $E_{OFF}$ |
| image sensor array | S, S1, S2 |
| photosensor | $S_P$ |
| point | P |
| illumination pattern | X1, . . . , X4, XC |
| emitted light | L |
| reflected light | L' |
| distance to illuminated point | H |
| distance to lens | $H_E$, $H_S$, $H_{S1}$, $H_{S2}$ |
| array separation | B |
| distance to pixel | $B_E$, $B_S$ |
| angle | φ1, φ2 |
| depth map | DM |

What is claimed is:

1. A depth map generator comprising:
an array comprising a plurality of individually addressable array elements, each of the plurality of individually addressable array elements comprising at least one of a semiconductor emitter or a reflector arranged to reflect light emitted by a semiconductor emitter;
a driver configured to switch the plurality of individually addressable array elements on or off according to a predefined illumination pattern, the predefined illumination pattern comprising a plurality of array elements that are switched on each bounded by at least two array elements that are switched off;
at least one image sensor configured to detect light reflected from a scene illuminated by the predefined illumination pattern; and
a processor configured to compute a depth map of the scene from the light pattern based on an offset between an expected position of a detected pixel in the light pattern and an actual position of the detected pixel in the light pattern.

2. The depth map generator according to claim 1, wherein the semiconductor emitter is an infrared LED.

3. The depth map generator according to claim 1, wherein the individually addressable array elements comprise semiconductor emitters and a primary optical element arranged to shape the light emitted by the semiconductor emitters of the array.

4. The depth map generator according to claim 1, wherein the individually addressable array elements comprise reflectors, each of the reflectors being an individually addressable micro-mirror.

5. The depth map generator according to claim 1, wherein the array comprises at least 100 individually addressable array elements.

6. The depth map generator according to claim 1, wherein the image sensor comprises an array of photosensors sensitive to a wavelength of light originating from the array comprising the plurality of individually addressable array elements.

7. An illumination arrangement for use in a depth map generator, the illumination arrangement comprising:
an array of individually addressable array elements, each of the individually addressable array elements comprising at least one of a semiconductor emitter or a reflector arranged to reflect light emitted by a semiconductor emitter;
a driver configured to switch the plurality of individually addressable array elements on or off according to a predefined illumination pattern, the predefined illumination pattern comprising a plurality of array elements that are switched on each bounded by at least two array elements that are switched off;
at least one image sensor array configured to detect light reflected from a scene illuminated by the predetermined illumination pattern;
a processor configured to compute a depth map of the scene from the light pattern based on an offset between an expected position of a detected pixel in the light pattern and an actual position of the detected pixel in the light pattern;
a first interface configured to connect the driver to the depth map generator; and
a second interface configured to connect the processor to the depth map generator.

8. A method of generating a depth map of a scene, the method comprising:
- arranging a depth map generator in front of the scene, the depth map generator including an array comprising a plurality of individually addressable array elements, each of the plurality of individually addressable array elements comprising at least one of a semiconductor emitter or a reflector arranged to reflect light emitted by a semiconductor emitter;
- choosing an illumination pattern to illuminate the scene;
- switching, via a driver, the plurality of individually addressable array elements of the array one or off according to the illumination pattern;
- forming a light pattern from light reflected from the scene;
- detecting, with at least one image sensor, the light pattern; and
- computing a depth map of the scene from the light pattern based on an offset between an expected position of a detected pixel in the light pattern and an actual position of the detected pixel in the light pattern.

9. The method according to claim 8, wherein the switching comprises switching the plurality of individually addressable array elements on or off according to a sequence of the illumination patterns.

10. The method according to claim 9, wherein choosing the illumination pattern comprises choosing the sequence of the illumination patterns to successively illuminate the scene in at least one of a vertical direction and a horizontal direction.

11. The method according to claim 9, wherein the sequence of the illumination patterns is the inverse of a preceding illumination pattern.

12. The method according to claim 8, further comprising adjusting the illumination pattern on the basis of a computed depth map.

13. The depth map generator according to claim 1, wherein the at least one image sensor comprises a single image sensor.

14. The illumination arrangement of claim 7, wherein the at least one image sensor comprises a single image sensor.

15. The method of claim 8, wherein the illumination pattern comprises a plurality of array elements that are switched on each bounded by at least two array elements that are switched off.

* * * * *